(No Model.) 6 Sheets—Sheet 3.

J. H. R. WARD.
ELECTRIC ARC LAMP.

No. 451,189. Patented Apr. 28, 1891.

WITNESSES
Will A. Courtland
Nellie L. Pope

INVENTOR
JOHN H. R. WARD
BY HIS ATTORNEY
Edward P. Thompson (No Model.)
6 Sheets—Sheet 4.

J. H. R. WARD.
ELECTRIC ARC LAMP.

No. 451,189.  Patented Apr. 28, 1891.

WITNESSES
Will A. Courtland
Nellie L. Pope

INVENTOR
John H. R. Ward
BY HIS ATTORNEY
Edward P. Thompson (No Model.) 6 Sheets—Sheet 5.
J. H. R. WARD.
ELECTRIC ARC LAMP.

No. 451,189. Patented Apr. 28, 1891.

WITNESSES
Will A. Courtland
Nellie L. Pope

INVENTOR
John H. R. Ward
BY HIS ATTORNEY
Edward P. Thompson (No Model.) 6 Sheets—Sheet 6.
J. H. R. WARD.
ELECTRIC ARC LAMP.

No. 451,189. Patented Apr. 28, 1891.

Witnesses
W. H. Courtland
Nellie L. Pope.

Inventor:
JOHN H. R. WARD
BY HIS ATTORNEY
Edward P. Thompson

UNITED STATES PATENT OFFICE.

JOHN H. R. WARD, OF NEW YORK, N. Y., ASSIGNOR TO THE UNIVERSAL ARC LAMP COMPANY, OF SAME PLACE.

ELECTRIC-ARC LAMP.

SPECIFICATION forming part of Letters Patent No. 451,189, dated April 28, 1891.

Application filed December 11, 1890. Serial No. 374,345. (No model.)

*To all whom it may concern:*

Be it known that I, JOHN H. R. WARD, a citizen of the United States, and a resident of New York, county and State of New York, have invented certain new and useful Improvements in Electric-Arc-Lamp Feed Mechanism, (Case 2,) of which the following is a specification.

My invention relates to the mechanical construction of an arc lamp, and especially to the construction of the mechanism for feeding the upper carbon.

The object of the invention is the accomplishment of a gradual movement of the upper carbon, or a movement free from jerks. The object also is to provide a mechanism which is simple in construction, sure in operation, efficient in action and result, and adapted to be operated effectually with but one magnet.

The details, modifications, and combination of details to form a whole are accurately illustrated in the accompanying drawings, and fully described by reference to the same.

Fig. 6 is similar to Fig. 7, except that the magnet and mechanism are supplied.
Fig. 7 is a plan of the mechanism and the armature, two of the parts being shown in section.
Fig. 8 is a view, partly in section, of the pinion for engaging the rack on the carbon-holder, together with the gear-wheels, which are attached to said pinion. The arbor of the pinion is also shown.
Figs. 9 and 10 are rectangular views of one of the upper elements of the mechanism identified by reference-letter to the same part shown in several figures.
Fig. 11 is a view of a portion of the upper-carbon holder and brush for making electrical contact with the same when in any position except where the brush is opposite the rectangular hole. The dotted lines represent a high position of the carbon rod or holder electrically.
Figs. 12 and 3 represent different phases of the lamp mechanism, the former showing the position of the same when the upper-carbon holder is at rest. A portion of the frame is shown in section.
Fig. 4 is a view similar to Figs. 12 or 3 with certain parts omitted and a portion of the carbon-holder with its rack added. The large gear-wheel in this view is supposed to have rotated to a new position.

*a* represents a cylindrical casing for surrounding the inclosed mechanism, electric contacts, magnets, &c. It is supported upon rotary catches or projections *b*, suspended from the lower plate or casting *c*, hereinafter described. When these are turned part-way around the casing *a* will drop. The upper end of the casing extends into the upper casting *d*.

*c* represents an external view of the base-plate for the mechanism frame, magnet, German-silver coil, and upper plate or casting *d*.

Figure 6:
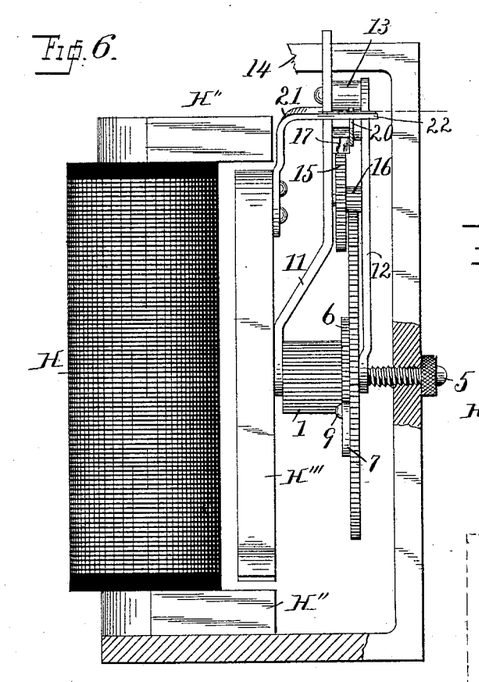
Figure 7:
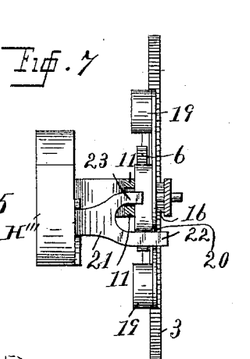
Figure 8:
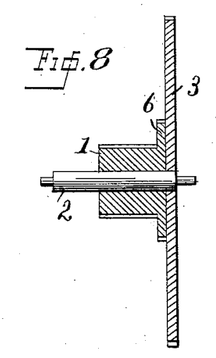
Figure 9:
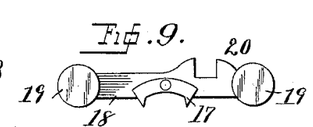

$c'$ is a disk or insulation located within the casting $c$, which is cylindrically hollow. It is made, preferably, of some kind of stone—as, for instance, slate. It is provided with a circular hole, through which passes a carbon-holder, with such other holes as may be necessary for the passage of wires, and with arc-shaped grooves for the passage of rods or pillars $e$, which are three in number and which are attached to the casting $c$ by means of screws $f$, which pass into the ends of the pillars $e$. The rings $g$ are screwed down tight against both the casting $c$ and the insulation $c'$, the screw-threads $h$ extending into the rings $g$. One or more screws $i$, having heads $j$, secure the frame $m$ to the insulating-plate $c'$. The central hole in the casting $c$ is so large as to leave merely a supporting-frame $n$, which helps to uphold the disk $c'$ of insulating material. The disk $c'$ is dotted in order to indicate arbitrarily that it is made of insulating material. The function of the disk $c'$ is to insulate the frame $m$ and everything attached thereto from the casting $c$, which is necessarily electrically connected to the rods $o$, and hence to the lower-carbon holder $p$. The pillars $e$ are tubular at and near both ends, so that the lower screws $f$ and the upper screws $f'$, one of which is shown in Fig. 6, may be screwed into said rods or pillars, and thereby secure the casting $b$ to the casting $c$.

$d$ represents the upper casting, which is supported upon the pillar $e$, and which in turn supports the element $q$, which is the chimney of the lamp. The casting $d$ consists of an inverted hollow cylindrical piece provided with a peculiarly-shaped ventilating-support for the chimney. This support consists of a tube $r$, provided with ribs or extensions $s$, radiating from the outer surface of said tube, said ribs being in the shape of steps, the step being represented by $s'$. Upon these steps, there being one step for each rib, rests the chimney $q$. Through the spaces between the ribs and below the steps $s'$ may pass air for ventilation. A similar construction is provided at the upper end of the chimney.

Into the tube $r$ screws a smaller tube $r'$, also provided with ribs or linear projections, which are lettered $t$. There are six ribs provided. Arc-shaped strips of insulation of fire-proof material, such as asbestos $u$, extend along and near the outer edges of said ribs. A subdivided coil of wire of high resistance, such as a German-silver coil $v$, is wound upon the asbestos. The ribs and asbestos serve to hold the wire coil at the proper distance from the tube $r'$, while the asbestos itself forms a good fire-proof insulation from the metal ribs $t$. The asbestos also forms a convenient bad conductor of heat. On the upper end of the tube $r'$ is provided an external screw-thread $r''$, which carries a cap $r'''$, provided with ribs $s''$.

$s'''$ represents steps corresponding to $s'$. Against these steps presses the upper end of the chimney $q$, so that the cool air which enters at the lower end of the chimney passes out at the upper end between the ribs $s''$. The interior of the chimney is lined with a comparatively heavy thickness of asbestos $q'$. This asbestos being a poor conductor of heat compared with metal, considerably less heat is conducted away to the magnet of the lamp than if it were not present. At the same time it is fire-proof substantially. The ring $w$ forms a part of the same casting with the cap $r'''$. This is the usual ring employed for suspending the lamp. Between the coil $v$ and the asbestos lining $q'$ is a cylindrical tubular space $x$ for a passage of some of the air passing through the cylinder.

Figure 1:
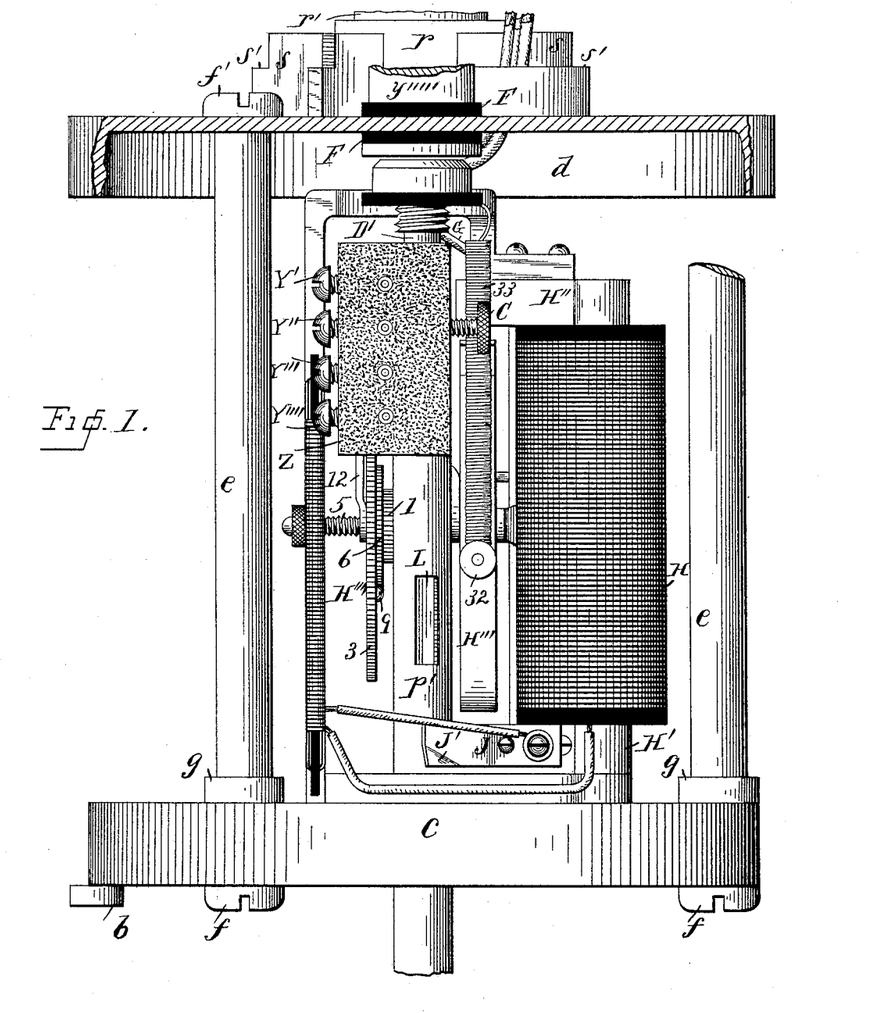
Figures 1 and 2 are rectangular views of each other in elevation of the middle portion of the lamp, showing particularly the mechanism and magnet, the frame for holding the same and other supports, all combined and arranged as in practice, portions of the figures being broken away. The outer casing is omitted so as to show the interior of the lamp.
Figure 2:
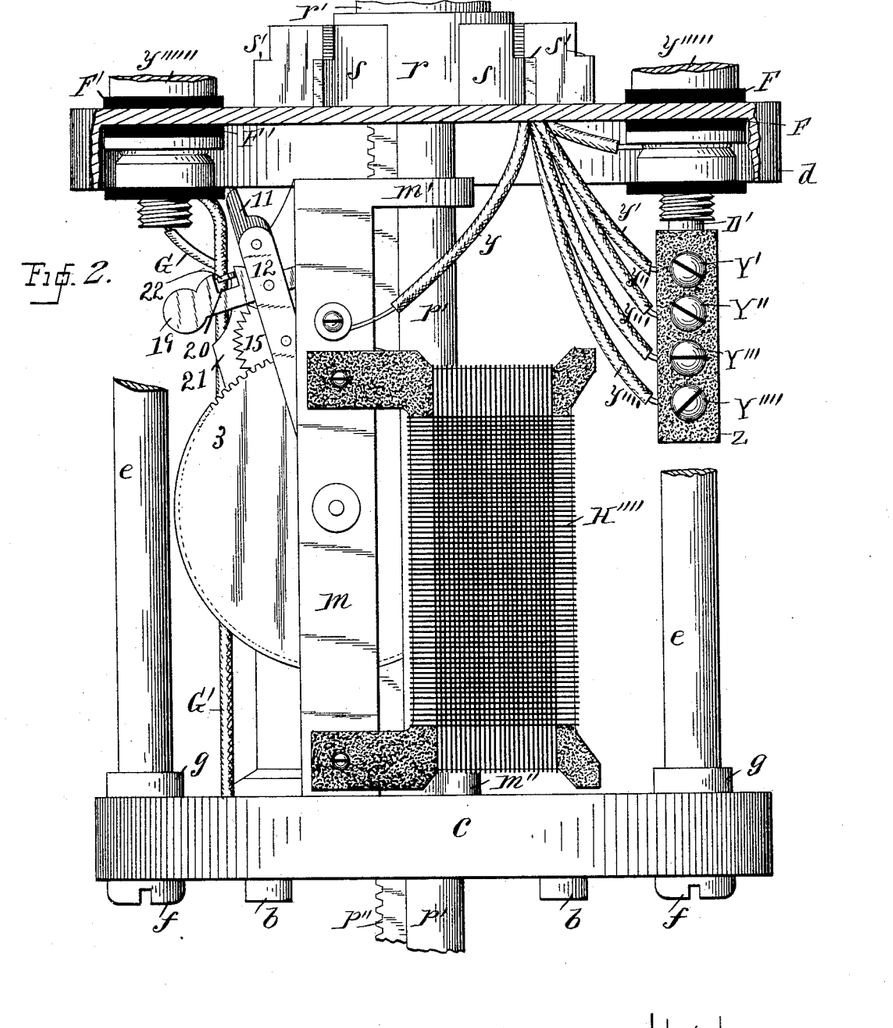
Figure 3:
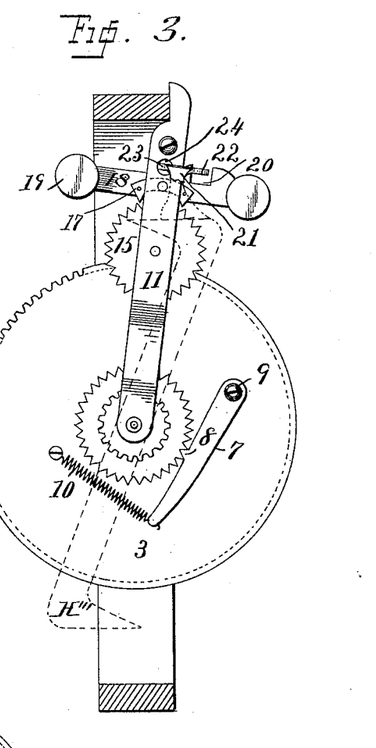
Figs. 3, 4, 6, 7, 8, 9, 10, 11, and 12 represent details separated from each other.
Figure 4:
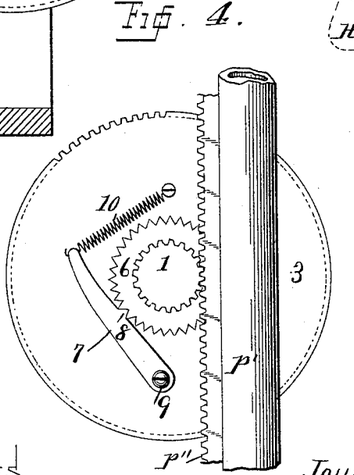
Figure 5:
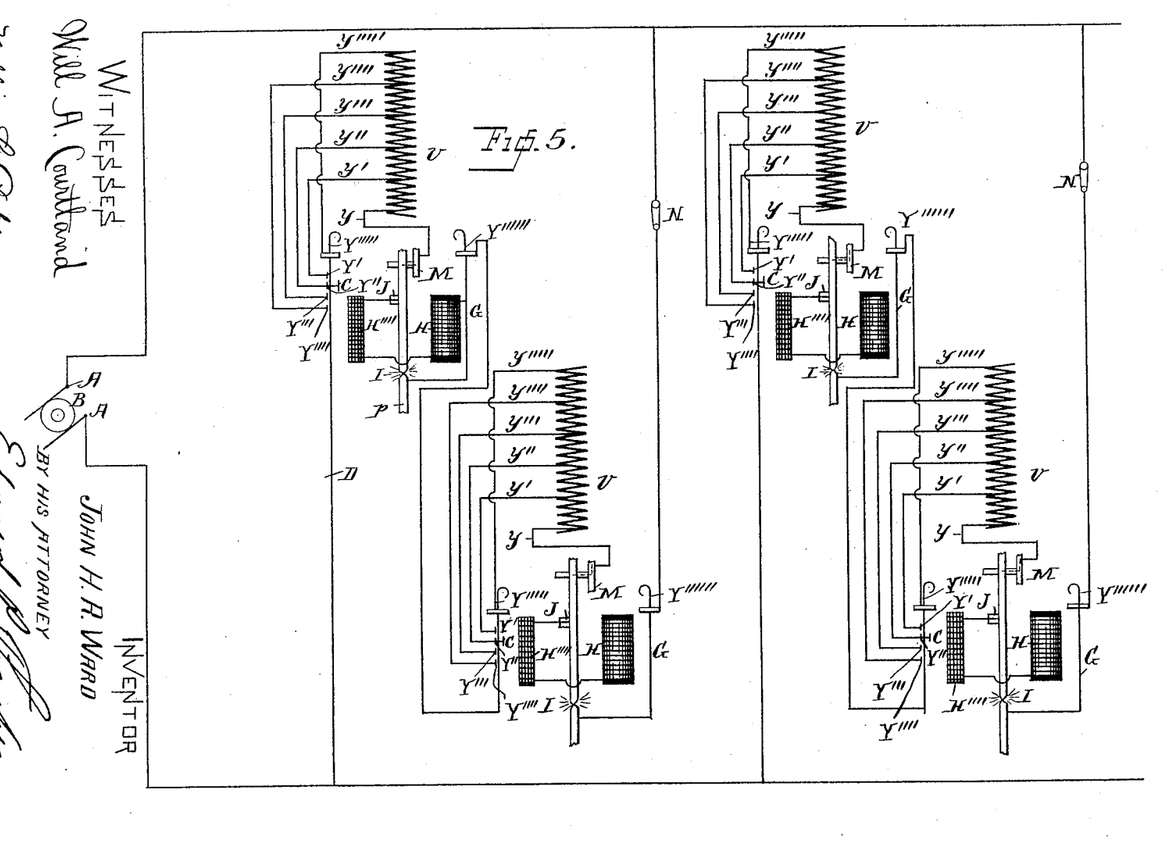
Fig. 5 is a view, partly in diagram, of the external and internal circuits of a complete system equipped with my arc lamp. The letters of reference identify the parts with several of the other figures. Lamps in pairs are arranged in parallel.

$y\ y'\ y''\ y'''\ y''''\ y'''''$ are copper conductors connecting the terminals of the several sections of the subdivided coil $v$ (see Fig. 3) to the respective terminals of the various electrical devices or parts of the lamp. The wire or conductor $y$ connects with the frame $m$ at the binding-post Y. The conductors $y'$ connect with the uppermost binding-post Y$'$, which is mounted upon the block $z$ of insulating material. Binding-posts Y$''$ Y$'''$ Y$''''$ are provided upon the block $z$, are insulated from each other, and are respectively connected permanently with the conductors $y''$ $y'''$ $y''''$. The conductor $y'''''$ is connected to one of the terminals Y$'''''$ of the lamp, the other terminal being indicated by Y$''''''$. The terminals Y$''''''$ and Y$'''''$ are connected to the poles A, respectively, of the generator B. A screw-plug C is adapted to pass through one or the other openings made in the conductor D and to press against any one of the binding-posts Y$'$ Y$''$, &c. The conductor D is enlarged, as indicated in the lamp by D$'$, which passes through the entire length of the block $z$. When the screw-plug C enters holes E in said enlarged portion D$'$, it presses against one or the other of the binding-posts Y$'$ Y$''$, &c., so that according to the hole in which the screw-plug is introduced one or more of the sections of the subdivided coil $v$ will be included in circuit with the carbon-holders. The enlarged portion D$'$ forms a projection to the terminal Y$'''''$, which is properly insulated by washers F from the casting $d$. Similar washers F$'$ insulate the terminal Y$''''''$ from the casting $d$. The binding-post Y$''''''$ connects by the conductor G with the magnet H. The same terminal is connected by the conductors G$'$ with the lower-carbon holder $p$. The conductor G$'$ passes through one of the tubes $o$, (see Fig. 1,) where it issues from said tube and connects with said carbon-holder. The frame $m$ has a projection $m'$, provided with a hole, through which passes the upper-carbon holder $p'$. The current through the conductor $y$ connects with the binding-post Y, which is connected to the frame $m$. From thence it passes to the projection $m'$ to the upper-carbon holder $p'$, thence through the arc I to the lower-carbon holder $p$, thence through the conductor G$'$, then, branching, it enters both the binding-post Y''''' and the magnet H to a brush J, which bears against the upper-carbon holder $p'$. In this circuit is included also the German-silver coil H''''. This holder is provided with a hole L, so that when the carbon has fallen or has been fed to approximately its lowest position the brush J ceases contact with the holder, which is in the form of a tube. In order to prevent the lower edge of the brush J from catching the carbon-holder $p'$ in an upward movement, the dog-ear J' is formed on said brush, the said dog-ear extending outwardly from said holder. The brush J is bent outward, as indicated by the bent portion J'. The brush is attached to insulation M, which is mounted upon the pole-piece H' of the magnet H. It is found in practice to be much more effectual to have the hole L than to have the same filled with insulating material, which is likely to become burned at the edges by sparking or to become warped by atmospheric changes, or to become covered with particles of dust, which serve gradually to disintegrate the insulation. The brush J is of such a tension and of such a length that when it arrives opposite the hole L it will not be in contact with the holder $p'$, so that when the carbon-holder is in its lowest position the magnet H will be cut out of circuit. At any time desirable the carbon-holders $p$ and $p'$ may be cut out of circuit by circuit-controllers N. (See Fig. 5.)

It was stated above that electrical contact from the frame $m$ to the carbon-holder $c'$ was made at the projection $m'$. It is also formed at the projection $m''$, through which is a hole for the passage of the carbon-holder $c'$. The holes in the projections $m'$ and $m''$ are as nearly as possible equal to the diameter of the carbon-holder $c'$, while the surfaces of all three elements are bright, so that the electrical contact is certain. The poles H' of the magnet have horizontal polar projections H'', which project over the extremities of the armature H'''.

When the lamp is included in a circuit carrying a current of high electro-motive force as compared with another current carrying a lower electro-motive force, the lamp may be adapted for each current by varying the number of seconds of the coil $v$ in direct circuit. The whole of said coil is always in circuit, but when the screw-plug C is put in contact with the binding-post Y''''', for instance, the uppermost section of the coil becomes a shunt to the other coils, so that the resistance of the lamp becomes less than when the screw-plug C is removed. The resistance may be further decreased by placing said screw-plug successively in contact with the binding-posts Y''' Y'' Y'.

It may be noticed that the magnet H, which is carried by the frame $m$, is not only electrically insulated, but is also insulated as to heat from the coil $b$, which on account of its comparatively high resistance becomes very hot. The slate disk $c'$ is practically, on account of its mass, a non-conductor of heat, while the air-space between the upper part of the frame $m$ and the casting $d$ is also practically a non-conductor of heat. Further, the disk $c'$ is well ventilated, so that it will not collect very much heat. The result is that the magnet H does not rise to a very high temperature. At least its temperature is much lower than is generally attained by other lamps of this class, in so far as my experience is concerned. The ventilation through the lamp-chimney is also a means of maintaining the temperature of the magnet H as low as possible. The object in maintaining or obtaining a small increase of temperature of the magnet H over the ordinary atmospheric temperature may be stated as follows: As the resistance increases with the heat, the resistance of the wire of the magnet H gradually increases, so that a considerable time passes before the lamp reaches its normal condition. By the mechanical construction of the lamp this interval of time is considerably shortened.

The coil H'''' is of such diameter and length that the current of the lamp heats it, and thereby causes its resistance to increase. Consequently the resistance of the circuit of the magnet H increases almost immediately after the current begins to pass through the lamp. Without this German-silver coil the resistance of said circuit would increase only slowly, and therefore the lamp would correspondingly slowly reach its normal candle-power. It is true that the German-silver coil is not an absolute compensator; but when its resistance is about two-thirds that of the magnet H it so fully compensates that the lamp is practically of a given uniform candle-power within a few seconds after the current is turned on.

Figure 11:
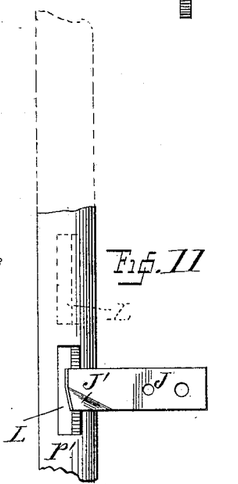
Figure 12:
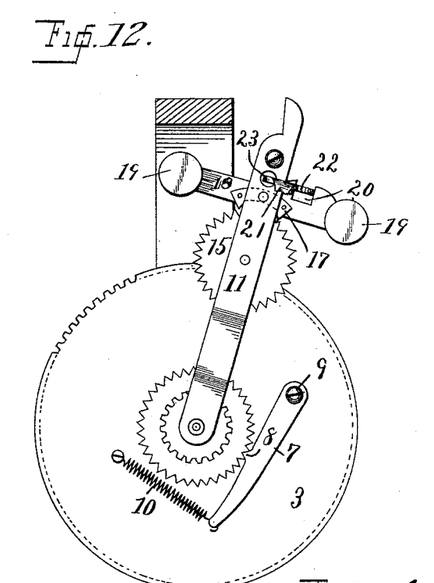
Figure 13:
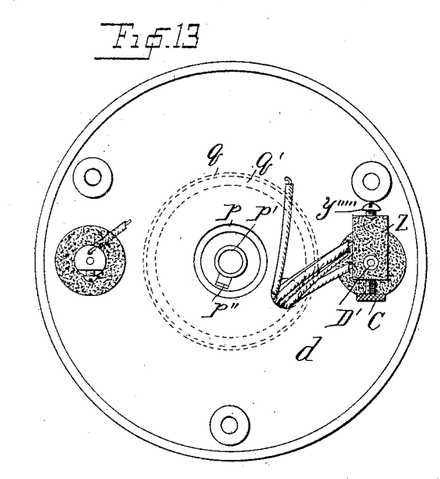
Fig. 13 is a view, looking upward, of the top plate or cover immediately above the mechanism and magnet.
Figure 14:
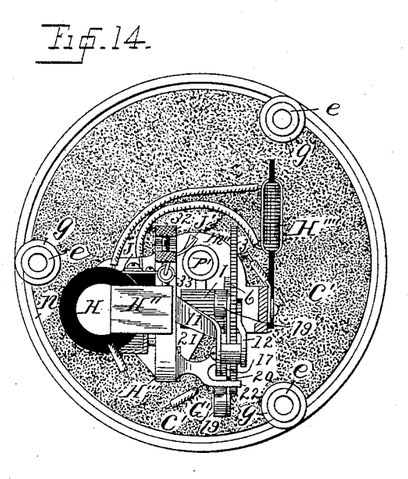
Fig. 14 is a plan view of the mechanism, magnet, and their supporting-frame and their adjuncts, the upper portion of the frame being in section and the base-plate being represented by the outer circles, the pillars for supporting the upper plate or cover being visible.

In order to clearly continue the description without confusion as to the remaining elements of the lamp, which are indicated by reference-letters, figures—such as 1, 2, 3, 4, &c.—are employed for indicating the remaining elements of the lamp, whether mechanism, modifications, or details not already described. $p''$ being the rack on the carbon-holder $p'$, 1 is the pinion geared to said rack. 2 is an arbor carrying the pinion, while 3 is a gear-wheel of larger size than the pinion and rotary on the arbor. The arbor is journaled at one end in the armature H''' and at the other end in a hole in the end of the adjustable screw 5. The arbor is loose in its bearings, so that it can turn independently of the armature or fixed screw 5. 6 is a ratchet-wheel, rigidly connected to the pinion 1 and of medium size, between the said pinion and the wheel 3. The teeth of the pinion are of substantially equal slope on both sides. They are in the shape of angular teeth radiating from the center. Upon the wheel 3 and flat against its surface is pivoted a pawl 7, of which its projection 8 engages with the said ratchet-wheel 6. The pivot 9 is at one end of the pawl, while the opposite end is held by a retractile spring 10, permanently under tension and holding the projection 8 engaged with the wheel 6. The carbon-holder $p'$ may be forced upward by the operator's hand very rapidly, since the projection 8 will slip over the teeth of the wheel 6. Under ordinary circumstances, however—i. e., during the normal condition of the lamp and while working—the pawl 7 serves to hold the pinion 1 fast to the wheel 3, so that any motion communicated to the wheel 3 will operate the rack and carbon-holder. Upon the arbor 2 is pivoted a double lever, of which one part is 11 and the other 12. This lever is free to move independently of the pinion 1 and arbor 2. The two parts of the lever are rigidly secured together at their outer ends by the connecting-piece 13. The part 11 of the lever is longer than the part 12, and is of such length as to strike against the upper horizontal cross-piece 14 of the frame which supports the mechanism. One of the functions of this double lever is to form bearings or supports of a ratchet-wheel 15, whose arbor has its respective ends loosely bearing in the respective parts 11 and 12 of the double lever. A small gear-wheel 16 is centrally secured to the ratchet-wheel 15 and gears with the large wheel 3. The said ratchet-wheel 15, whose teeth are pointed and radiate from the center, engages with a double pawl 17. This pawl is attached rigidly to a substantially horizontal beam or bar 18, balanced at the ends by weights 19. A detent 20 is provided on the upper side of the bar 18, in which detent or notch is located an arm 21, attached to and projecting from the armature $H'''$. A portion of the arm 21 is shown in Fig. 23, all the lower portion being omitted, so as not to hide the mechanism. The part which is omitted in Fig. 23 is dotted in Fig. 24, as also is the armature $H'''$. As may be noticed in Figs. 11 and 18, the arm 21 is forked, while one tine 22 lies in the notch 20. In Fig. 23 the tine rests against the right-hand side of the notch and produces enough resistance or holding force to prevent the gravity of the carbon-holder from rotating the wheels and descending. The other tine 23 passes through a hole 24. When the armature $H'''$ is attracted by the magnet, it rotates into a position more nearly vertical and more nearly parallel to the axis of the magnet. As soon as the armature is attracted or moved so far that the part 11 of the lever strikes the frame, which acts as a stop, the said lever causes the pawl 17 to release the mechanism, so that the carbon-holder can rotate the mechanism and fall. The reason lies in the fact that the part 11 of the lever has a hole larger in diameter than the width of the tine 23, which passes through it. Consequently the tine 22 can move a little farther than the said lever and break contact with the side of the notch or detent 20. The mechanism is now free to rotate by the power of the falling carbon-holder; but just as soon as it falls so far that the electrical resistance of the circuit through the carbons decreases, then the current in the magnet decreases and the armature falls back, so that the tine 22 presses upon the side of the detent in the bar 18 and holds the mechanism and carbon stationary.

Figure 10:
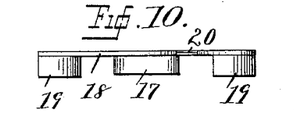
Figures 15, 16, 17:
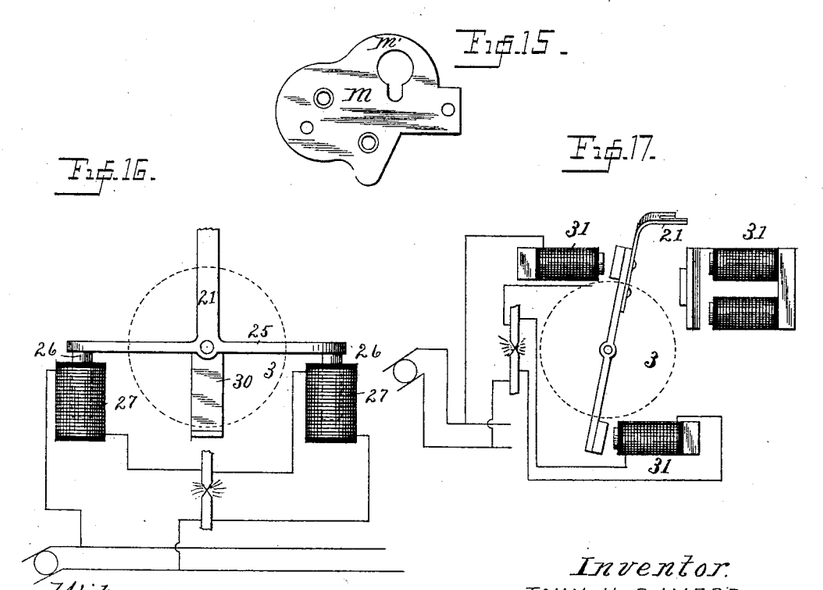
Fig. 15 is a plan view of the lower part of the frame for supporting the mechanism and magnet, armature, &c., the said lower part of the frame not being entirely visible in Fig. 14. The stippled portion represents a plate for insulating the magnet from the heat, which may be conducted from the coil in the chimney and for electrically insulating the frame of the lamp mechanism from the rest of the lamp. This plate is made preferably of slate and is seen in Fig. 14.
Figs. 16 and 17 represent modifications of the invention, having particular reference to the magnet for operating the mechanism in conjunction with the armature or armatures of the magnet.

It is evident that the armature need not be operated by the exact means indicated, but that modifications may be employed. Two of these, as samples, are shown in Figs. 16 and 17. These show that the forked arm 21 may be attached to a beam or bar 25, connecting two cores 26 of solenoid 27. The bar 25 is pivoted at the point 29 to the supporting-frame 30. The one magnet is in a shunt and the other in series with the arc of the lamp. In Fig. 10 the solenoids are replaced by magnets 31, which are arranged in circuit in the same manner, as described.

I claim as my invention—

1. In an electric-arc lamp, the combination, with the carbon-holder, of a toothed rack located thereon, a pinion geared thereto and mounted upon an arbor, an armature to an electro-magnet in circuit with the carbons of the lamp, a toothed wheel 3, loose upon the said arbor and carrying a pivoted pawl which is engaged with a ratchet-wheel fastened to said pinion, a double lever pivoted loosely upon said arbor and carrying a gear-wheel 16, which is geared to said wheel 3, and which carries a ratchet-wheel 15, engaging with a double pawl, a pivoted bar 18, provided with a detent and carrying said double pawl, a forked arm having two tines fastened to said armature, the one tine being located in the said detent and the other tine in a hole which is provided in the said double lever, weights located upon opposite ends of said bar, and a stop—as, for instance, the frame located in the path of said double lever—as and for the purpose set forth.

2. In an arc lamp, the combination of a hollow cylindrical casting $c$, a circular disk of a non-conductor $c'$ of heat or electricity, such as slate, of smaller diameter than that of the interior of the casing and resting therein concentrically, pillars $e$, having collars $g$ resting upon both the said slate and the rim of said casting and having heads $f$ screwed upon said pillars and pressing upon the lower side of said casting, thereby retaining the slate in said casting and maintaining said pillars upright, an upper casting $d$, through which said pillars pass, screws $f'$, screwed into said pillars and pressing upon said casting $d$, and a mechanism-supporting frame $m$, supported on said slate and escaping said casting $d$.

3. In an arc lamp, the combination of a hollow cylindrical casting $c$, a circular disk of a non-conductor $c'$ of heat or electricity, such as slate, of smaller diameter than that of the interior of the casing and resting therein concentrically, pillars $e$, having collars $g$ resting upon both the said slate and the rim of said casting and having heads $f$ screwed upon said pillars and pressing upon the lower side of said casting, thereby retaining the slate in said casting and maintaining said pillars upright, an upper casting $d$, through which said pillars pass, screws $f'$, screwed into said pillars and pressing upon said casting $d$, a mechanism-supporting frame $m$, supported on said slate and escaping said casting $d$, said frame having upper and lower perforated projections $m'$ and $m''$, respectively, through which passes the carbon-holder $p'$, and having pole-pieces $H''$ and $H'$ attached, respectively, to the upper and lower portions of the frame, between which and connecting which is the operating-magnet of the lamp.

4. In an arc lamp, the combination of an upper movable hollow cylindrical carbon-holder $p'$, provided with a rectangular perforation L upon one side thereof, an electric terminal brush J, stationary relatively to the said carbon-holder and whose free end presses upon said holder in an elemental line of the said cylindrical holder, so that when the perforation is at the same level as the brush the latter parts contact with the holder, and an outwardly-turned lip or dog's ear $J'$, forming an integral portion of said brush, whereby the upward movement of the said holder will not catch the edge of the said brush.

5. In an arc lamp, an insulating parallelopipedon block Z, supported upon said lamp, a subdivided regulating-coil $v$, having terminals $y'\ y''\ y'''$, &c., terminating in holes in said block, a conducting-tube $D'$, forming one terminal of said lamp and extending downward through said block, and a conducting-plug connecting said tube $D'$ with one of said terminals $y'$, which are held stationary in said block by screws $Y'\ Y''\ Y'''$, &c.

In testimony that I claim the foregoing as my invention I have signed my name, in presence of two witnesses, this 22d day of November, 1890.

JOHN H. R. WARD.

Witnesses:
W. A. COURTLAND,
EDWARD P. THOMPSON.